US012795799B2

(12) United States Patent
Meerbeek et al.

(10) Patent No.: US 12,795,799 B2
(45) Date of Patent: Nov. 10, 2026

(54) CONTROLLING LIGHT OUTPUT LEVEL BASED ON MEASURED LIGHT DIFFERENTLY IN DIFFERENT OPERATING MODES

(71) Applicant: SIGNIFY HOLDING B.V., Eindhoven (NL)

(72) Inventors: Berent Willem Meerbeek, Veldhoven (NL); Dzmitry Viktorovich Aliakseyeu, Eindhoven (NL); Jan Ekkel, Oss (NL); Gerhardus Engbertus Mekenkamp, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 84 days.

(21) Appl. No.: 18/865,391

(22) PCT Filed: May 10, 2023

(86) PCT No.: PCT/EP2023/062477
§ 371 (c)(1),
(2) Date: Nov. 13, 2024

(87) PCT Pub. No.: WO2023/217891
PCT Pub. Date: Nov. 16, 2023

(65) Prior Publication Data
US 2026/0190201 A1 Jul. 2, 2026

(30) Foreign Application Priority Data
May 13, 2022 (EP) .................................... 22173142

(51) Int. Cl.
*H05B 47/11* (2020.01)
*H05B 47/125* (2020.01)
(Continued)

(52) U.S. Cl.
CPC ........... *H05B 47/11* (2020.01); *H05B 47/125* (2020.01); *H05B 47/13* (2020.01); *H05B 47/155* (2020.01);
(Continued)

(58) Field of Classification Search
CPC ...... H05B 47/11; H05B 47/125; H05B 47/13; H05B 47/155; H05B 47/17; H05B 47/19; H05B 47/1985
See application file for complete search history.

(56) References Cited

U.S. PATENT DOCUMENTS

2010/0171442 A1* 7/2010 Draper .................. H05B 45/20 315/297
2011/0001438 A1* 1/2011 Chemel ............... H05B 47/155 315/297
(Continued)

FOREIGN PATENT DOCUMENTS

WO 2013067389 A1 5/2013

*Primary Examiner* — Raymond R Chai

(57) ABSTRACT

A method comprises obtaining (101) mode information indicative of a current operating mode of a light sensor or a lighting device and selecting (103) a function based on the current operating mode. The current operating mode has been selected from at least a first operating mode and a second operating mode. The function defines a relation between a reference measured light level and a target light output level. One or more light sources are controlled differently based on a measured light level according to a first function associated with the first operating mode than according to a second function associated with the second operating mode. The method further comprises obtaining (105) the measured light level, determining (107) a light output level by applying the selected function to the measured light level, and controlling (109) the one or more light sources to render light with the determined light output level.

13 Claims, 5 Drawing Sheets

(51) Int. Cl.

| | |
|---|---|
| ***H05B 47/13*** | (2020.01) |
| ***H05B 47/155*** | (2020.01) |
| ***H05B 47/17*** | (2020.01) |
| ***H05B 47/175*** | (2020.01) |
| ***H05B 47/19*** | (2020.01) |

(52) U.S. Cl.
CPC ............. *H05B 47/17* (2020.01); *H05B 47/19* (2020.01); *H05B 47/1985* (2024.01)

(56) References Cited

U.S. PATENT DOCUMENTS

| | | | | |
|---|---|---|---|---|
| 2012/0043889 | A1* | 2/2012 | Recker ................. | H05B 45/375 315/86 |
| 2014/0292208 | A1* | 10/2014 | Chemel .................. | H05B 45/12 315/154 |
| 2015/0271887 | A1 | 9/2015 | Pandharipande et al. | |
| 2016/0050736 | A1 | 2/2016 | Hoang | |
| 2017/0042001 | A1* | 2/2017 | Chemel .................. | H05B 45/12 |
| 2017/0374715 | A1 | 12/2017 | You et al. | |
| 2019/0182931 | A1 | 6/2019 | Magielse et al. | |
| 2020/0100342 | A1 | 3/2020 | Senescu et al. | |

* cited by examiner

CONTROLLING LIGHT OUTPUT LEVEL BASED ON MEASURED LIGHT DIFFERENTLY IN DIFFERENT OPERATING MODES

CROSS-REFERENCE TO PRIOR APPLICATIONS

This application is the U.S. National Phase application under 35 U.S.C. § 371 of International Application No. PCT/EP2023/062477, filed on May 10, 2023, which claims the benefit of European Patent application Ser. No. 22/173,142.5, filed on May 13, 2022. These applications are hereby incorporated by reference herein.

FIELD OF THE INVENTION

The invention relates to a system for controlling one or more light sources based on a measured light level.

The invention further relates to a method of controlling one or more light sources based on a measured light level.

The invention also relates to a computer program product enabling a computer system to perform such a method.

BACKGROUND OF THE INVENTION

Often, different types of lighting devices and/or systems are used in offices than in homes. In offices, it is typically important to maintain a minimum light level at each desk. Light sensors may be used to realize this. This is also referred to as daylight harvesting. Lighting devices in smart homes may also provide such a function, but home users normally have different lighting needs and often use light scenes, e.g. a "Relax" scene, an "Energize" scene, and/or a "Reading" scene that vary in brightness and color temperature or a "Savannah Sunset", "Tokyo", or "Arctic Aurora" scene to set a particular ambiance with colored light. US 2019/0182931 A1 discloses a lighting system for a smart home that makes it possible to switch from daylight harvesting to a light scene. However, a drawback of the lighting system of US 2019/0182931 A1 is that while it uses a light sensor in a certain embodiment, this light sensor is only used to provide a daylight harvesting mode, which limits the usefulness of the light sensor to one application.

WO 2013/067389 A1 discloses an ambient light sensor which measures an ambient light level an illuminated environment and provides an indication of the measured ambient light level to a processor. The processor maps the measured ambient light level to an estimated ambient light level at a different point in the illuminated environment from the measured ambient light level. The processor may determine the difference between the estimated ambient light level and a desired light level at the task height, and may change the artificial illumination provided by a light fixture to make the actual ambient light level at task height match the desired light level at the task height.

SUMMARY OF THE INVENTION

It is a first object of the invention to provide a system, which is able to control one or more light sources based on a measured light level without limiting the use of the light sensor to daylight harvesting.

It is a second object of the invention to provide a method, which can be used to control one or more light sources based on a measured light level without limiting the use of the light sensor to daylight harvesting.

In a first aspect of the invention, a system for controlling one or more light sources based on a measured light level comprises at least one input interface, at least one control interface, and at least one processor configured to obtain mode information indicative of a current operating mode of a light sensor or a lighting device, said current operating mode having been selected from a plurality of operating modes, said plurality of operating modes comprising a first operating mode and a second operating mode, select a function based on said current operating mode, wherein said function defines a relation between a reference measured light level and a target light output level, said one or more light sources being controlled differently based on said measured light level according to a first function than according to a second function, said first function being associated with said first operating mode and said second function being associated with said second operating mode, obtain, via said at least one input interface, said measured light level, determine a light output level by applying said selected function to said measured light level, and control, via said at least one control interface, said one or more light sources to render light with said determined light output level.

With this system, a mode of operation may be selected from a plurality of modes and/or the current mode of operation may be changed to a different mode of the plurality of modes while the function of light output of the one or more light sources in relation to the measured (ambient) light levels are different for different modes of operation. This system provides an easy way for users to set the relation between measured light level and desired light behavior.

Depending on the situation, users might desire different light behaviors as function of the measured light level. In a functional lighting use case, as soon as the ambient light level increases, the functional lighting is preferably dimmed. However, for decorative lighting, such as the colored light scenes or for entertainment lighting, the brightness of the scene might need to increase as the ambient light level increases, as otherwise the decorative effect of the color lighting is no longer visible. The different functions may also be referred to as different light profiles.

Users may be able to set a mode of operation for each individual light sensor in the lighting system or per lighting device or group of lighting devices associated with the light sensor. This mode may be set during commissioning of the light sensor or the lighting device(s) and/or changed during usage of the sensor or the lighting device(s). The mode change may be initiated by the user or by the system.

For example, the mode of a light sensor may be set by the user via a user interface of the system, e.g., via a smart phone app when adding the light sensor to a room and configuring it. The mode of the light sensor may also be set automatically, for example based on the location of installation (e.g. outdoor, study, living room, kitchen). The mode of the light sensor may be changed during usage either by a user input (e.g., tapping on the sensor device, flipping a switch) or automatically based on another system parameter (e.g., time of day, other sensor output).

Said mode information may be indicative of a current operating mode of a light sensor and one or more lighting devices associated with said light sensor may comprise said one or more light sources. The system may be a sensor device comprising the light sensor or a light controller, for example. When the operating mode is defined for a light sensor, the behavior of the lighting devices may be easiest to understand for a user.

Alternatively, said mode information may be indicative of a current operating mode of a lighting device and said lighting device may comprise said one or more light sources. The system may be the lighting device or a light controller, for example. When the operating mode is defined for a lighting device instead of for a light sensor, lighting devices connected to the same light sensor may behave differently based on the measured light level rather than that all lighting devices connected to the light sensor behave in the same way. This provides more flexibility.

Said first function may define a positive relation between said reference measured light level and said target light output level such that in said first function a first target light output level resulting from a first reference measured light level is larger than a second target light output level resulting from a second measured light level when said first reference measured light level is larger than said second reference measured light level. This first function is beneficial, for example, in situations where the lighting devices provide decorative lighting—for example garden beautification, wall washing, etc.—where the light output of the decorative lights need to be increased with increased ambient light levels to ensure to decorative effect is visible. This first function is also referred to as daylight following function in this specification.

Said second function may define a negative relation between said reference measured light level and said target light output level such that in said second function a third target light output level resulting from a third reference measured light level is smaller than a fourth target light output level resulting from a fourth measured light level when said third reference measured light level is larger than said fourth reference measured light level. This second function is beneficial, for example, in situations where the lighting devices provide functional lighting, for example to work or read, where in case of sufficient daylight there is no need for electrical lighting. This second function is also referred to as daylight counterbalance function in this specification. Daylight counterbalance is also referred to as daylight harvesting.

Said at least one processor may be configured to change said current operating mode from said first operating mode to said second operating mode and/or from said second operating mode to said first operating mode. By allowing the operating mode to be changed after commissioning, more flexibility is provided. This is beneficial, for example, when the lighting device or light sensor is moved to a different space or when the use of a space changes.

Said at least one processor may be configured to receive, via a user interface of said system, user input for changing said current operating mode. By allowing the user to change the current operating mode manually, the user has full control over the behavior of the one or more light sources. The user may be able to disable any automatic changes of the current operating mode, e.g. via the same user interface.

Said at least one processor may be configured to obtain information indicative of a type of space in which said light sensor or said lighting device are located and/or indicative of a time of day and change said current operating mode based on said type of space and/or said time of day. As a first example, during commissioning, the user may be able to assign a sensor device to a room and for that room, a default mode of the light sensor may be selected. For instance, when the user places the sensor device in the entertainment room, the daylight following mode may be selected so it will increase the brightness of the entertainment lighting devices to ensure the light effects are well visible, as there is more ambient lighting. If the same sensor device is placed in a home office, the daylight counterbalance mode may be selected, such that the lighting devices dim down when there is sufficient daylight. As a second example, the system may control the lighting device in daylight counterbalance mode during office hours, but in daylight following mode outside office hours. This may improve the user experience, because it is not always easy for a user to select the most suitable operating mode manually.

Said at least one processor may be configured to detect motion and/or an activity of a user and/or obtain a measured spectral composition and change said current operating mode based on said detected motion and/or activity and/or said spectral composition. As a first example, the system may control the lighting device in daylight counterbalance mode when (excessive) motion is detected, but in daylight following mode when no (excessive) motion is detected as to support the user with enough light when moving around the room. As a second example, the system may control the lighting device in daylight counterbalance mode when the user is detected to be working, but in daylight following mode when the user is detected to be performing a leisure activity. This may improve the user experience, because it is not always easy for a user to select the most suitable operating mode manually.

Said mode information may be indicative of a current operating mode of a lighting device and said at least one processor may be configured to detect a current light setting of said lighting device and change said current operating mode based on said current light setting of said lighting device. For example, if most of the lighting devices in a zone are rendering saturated colors, the operating mode of the light sensor might be changed to daylight following mode. This may improve the user experience, because it is not always easy for a user to select the most suitable operating mode manually. The current light setting may be set by automatically, e.g. by routines/schedules, or manually, e.g. when the user selects a color with the help of a color picker.

Said mode information may be indicative of a current operating mode of a lighting device and said at least one processor may be configured to receive, e.g. via a user interface of said system, input for selecting a light scene involving at least said lighting device, determine said current operating mode of said lighting device by determining an operating mode associated with said light scene, and change said current operating mode to said operating mode associated with said light scene. For example, the operating mode of a lighting device may be changed to daylight following mode if a colorful scene is selected and to daylight counterbalance mode if a "Reading" scene is selected. This may help reduce the number of times the user needs to change operating modes. The scene may be selected manually or automatically.

Said at least one processor may be configured to determine a color or color temperature independent of said selected function and control, via said at least one control interface, said one or more light sources to render said light with said determined color or color temperature. This makes it possible for the user to select the color or color temperature desired by the user, e.g. soft white or cool white for functional lighting and warm white or a saturated color for decorative lighting.

In a second aspect of the invention, a lighting system comprise the above-described system and one or more of said one or more light sources and a light sensor for measuring said measured light level.

In a third aspect of the invention, a method of controlling one or more light sources based on a measured light level comprises obtaining mode information indicative of a current operating mode of a light sensor or a lighting device, said current operating mode having been selected from a plurality of operating modes, said plurality of operating modes comprising a first operating mode and a second operating mode, selecting a function based on said current operating mode, wherein said function defines a relation between a reference measured light level and a target light output level, said one or more light sources being controlled differently based on said measured light level according to a first function than according to a second function, said first function being associated with said first operating mode and said second function being associated with said second operating mode, obtaining said measured light level, determining a light output level by applying said selected function to said measured light level, and controlling said one or more light sources to render light with said determined light output level. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling one or more light sources based on a measured light level.

The executable operations comprise obtaining mode information indicative of a current operating mode of a light sensor or a lighting device, said current operating mode having been selected from a plurality of operating modes, said plurality of operating modes comprising a first operating mode and a second operating mode, selecting a function based on said current operating mode, wherein said function defines a relation between a reference measured light level and a target light output level, said one or more light sources being controlled differently based on said measured light level according to a first function than according to a second function, said first function being associated with said first operating mode and said second function being associated with said second operating mode, obtaining said measured light level, determining a light output level by applying said selected function to said measured light level, and controlling said one or more light sources to render light with said determined light output level.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
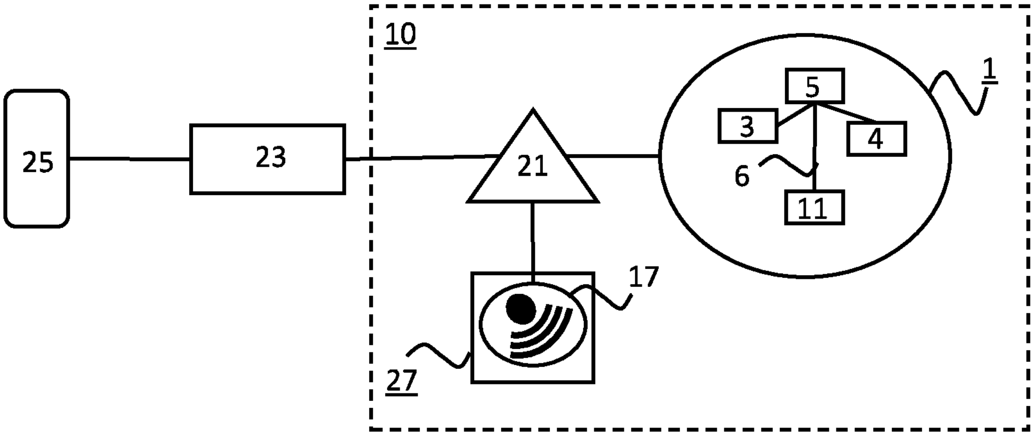
FIG. 1 is a block diagram of a first embodiment of the system.

FIG. 1 shows a first embodiment of the system for controlling one or more light sources based on a measured light level. In the first embodiment, the system is a lighting device 1. The lighting device 1 is part of a lighting system 10. The lighting system 10 further comprises a (light) controller 21 and a (connected) sensor device 27. The controller 21 may be a Philips Hue bridge, for example. The sensor device 27 comprises a light sensor 17. In the example of FIG. 1, the lighting device 1 and the sensor device 27 are connected to the controller 21, e.g. using Zigbee. The controller 21 is connected to a wireless LAN access point 23, e.g. using Wi-Fi or Ethernet. In the example of FIG. 1, a mobile device 25 is also connected to the wireless LAN access point 23, e.g. via Wi-Fi. The mobile device 25 may run an app for controlling the lighting device 1, for example. The mobile device 25 may be able to control the lighting device 1 via the wireless LAN access point 23 and the controller 21 and/or directly, e.g. using Bluetooth. The mobile device 25 may additionally or alternatively be able to control the lighting device 1 via the cloud.

The lighting device 1 comprises a receiver 3, a transmitter 4, a processor 5, a light source 11, and a control interface 6 between the processor 5 and the light source 11. The light source 11 may be a LED module, for example. In an alternative embodiment, the lighting device comprises a plurality of light sources. The processor 5 is configured to obtain mode information indicative of a current operating mode of the lighting device 1. This current operating mode has been selected from a plurality of operating modes, e.g. manually by a user using mobile device 25 or automatically. The plurality of operating modes comprises a first operating mode and a second operating mode.

The processor 5 is further configured to select a function based on the current operating mode. This function defines a relation between a reference measured light level and a target light output level. The light source 11 is controlled differently based on the measured light level according to a first function than according to a second function. The first function is associated with the first operating mode and the second function is associated with the second operating mode.

The processor 5 is further configured to obtain a measured light level (measured by the light sensor 17) from the light sensor device 27 via the receiver 3, determine a light output level by applying the selected function to the measured light level, and control, via the control interface 6, the light source 11 to render light with the determined light output level.

In the embodiment of FIG. 1, an operating mode is defined per lighting device or group of lighting devices associated with the light sensor 17. Each lighting device that is connected to the sensor device 27 has its own mode. This mode may be set by a user, e.g. using mobile device 25, or by the system. This mode may be set during commissioning of the lighting system 10 and/or changed during usage of the lighting system 10. The mode change may be initiated by the user or by the lighting system 10.

In the embodiment of the lighting device 1 shown in FIG. 1, the lighting device 1 comprises one processor 5. In an alternative embodiment, the lighting device 1 comprises multiple processors. The processor 5 of the lighting device 1 may be a general-purpose processor or an application-specific processor. In the embodiment of FIG. 1, the light sensor 17 is part of a separate sensor device 27. In an alternative embodiment, the light sensor 17 is part of the lighting device 1.

The receiver 3 and the transmitter 4 may use one or more wireless communication technologies. e.g. Zigbee, for communicating with the controller 21. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The lighting device 1 may comprise other components typical for a connected lighting device such as a power connector and a memory. The invention may be implemented using a computer program running on one or more processors.

In the embodiment of FIG. 1, the system of the invention is a lighting device. In an alternative embodiment, the system of the invention is a different device, e.g. a (light) controller or a sensor device. In the embodiment of FIG. 1, the system of the invention comprises a single device. In an alternative embodiment, the system of the invention comprises a plurality of devices.

Figure 2:
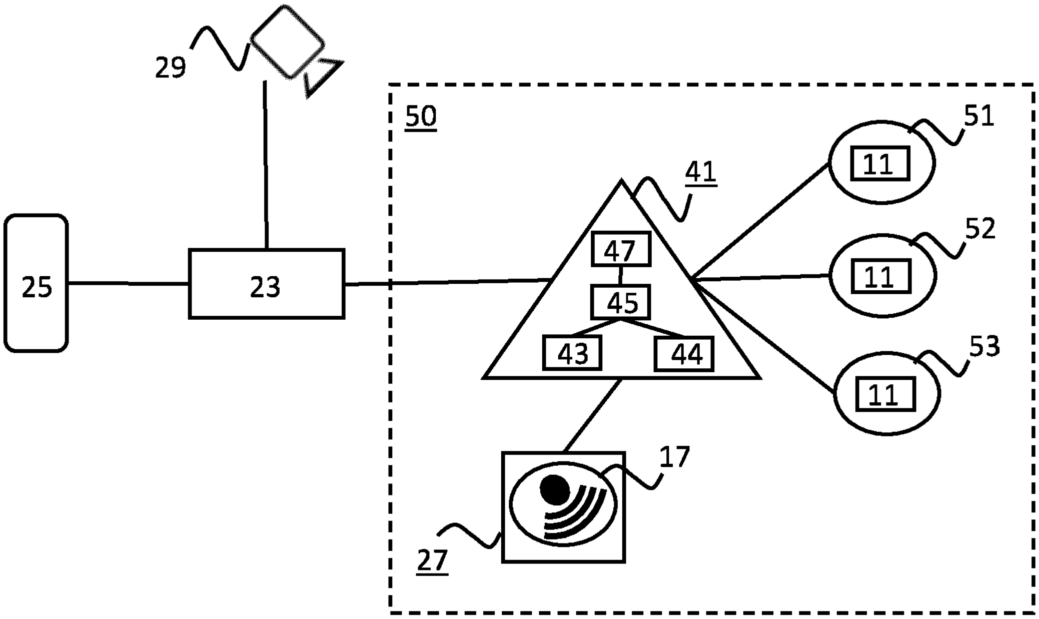
FIG. 2 is a block diagram of a second embodiment of the system.

FIG. 2 shows a second embodiment of the system for controlling one or more light sources based on a measured light level. In the second embodiment, the system is a (light) controller 41, e.g. a bridge or a gateway. The controller 41 is part of a lighting system 50. The lighting system 50 further comprises three lighting devices 51-53 and (connected) sensor device 27. In the example of FIG. 2, each lighting device comprises a light source 11, e.g. a LED module. Alternatively, a lighting device may comprise a plurality of light sources. The controller 41 may be a Philips Hue bridge, for example. The sensor device 27 comprises a light sensor 17. The sensor device 27 measures the light level and reports this to the controller 41.

The controller 41 comprises a receiver 43, a transmitter 44, a processor 45, and memory 47. The processor 45 is configured to obtain mode information indicative of a current operating mode of light sensor 17 or of a lighting device associated with the light sensor 17. This current operating mode has been selected from a plurality of operating modes. The plurality of operating modes comprises a first operating mode and a second operating mode.

The processor 45 may only be able to obtain mode information indicative of a current operating mode of light sensor 17, only be able to obtain mode information indicative of a current operating mode of a lighting device, or may be able to obtain mode information indicative of a current operating mode of light sensor 17 at a first moment and mode information indicative of a current operating mode of a lighting device at a second moment, e.g. in dependence on a configuration setting.

The processor 45 is further configured to select a function based on the current operating mode. This function defines a relation between a reference measured light level and a target light output level. The light source 11 is controlled differently based on the measured light level according to a first function than according to a second function. The first function is associated with the first operating mode and the second function is associated with the second operating mode.

The processor 45 is further configured to obtain the measured light level from the light sensor device 27 via the receiver 43, determine a light output level by applying the selected function to the measured light level, and control, via the transmitter 44, the light source 11 of the lighting device associated with the light sensor 17 to render light with the determined light output level.

Users may be able to set, e.g. by using mobile device 25, a mode of operation for each individual light sensor in the lighting system or per lighting device or group of lighting devices associated with the light sensor. This mode may be set during commissioning of the light sensor or lighting device(s) and/or changed during usage of the light sensor or lighting device(s). The mode change may be initiated by the user or by the lighting system 50.

In the example of FIG. 2, a camera device 27 is also connected to the wireless LAN access point 23, e.g. using Wi-Fi. The camera device 27 may be used to detect an activity of a user or motion, for example. Alternatively, the sensor device 27 may comprise an additional motion sensor, e.g. a PIR detector. RF-sensing may also be used to detect motion and/or the activity of the user. The processor 45 may be configured to detect motion and/or an activity of the user based on signals received from the camera device 29 and/or sensor device 27 and change the current operating mode of the light sensor 17 or of a lighting device associated with the light sensor 17 based on the detected motion and/or activity.

In the embodiment of the controller 41 shown in FIG. 2, the controller 41 comprises one processor 45. In an alternative embodiment, the controller 41 comprises multiple processors. The processor 45 of the controller 41 may be a general-purpose processor, e.g. ARM-based, or an application-specific processor. The processor 45 of the controller 41 may run a Unix-based operating system for example. The memory 47 may comprise one or more memory units. The memory 47 may comprise one or more hard disks and/or solid-state memory, for example.

The receiver 43 and the transmitter 44 may use one or more wired or wireless communication technologies such as Zigbee to communicate with the lighting devices 51-53 and Ethernet to communicate with the wireless LAN access point 23, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 43 and the transmitter 44 are combined into a transceiver. The controller 41 may comprise other components typical for a controller such as a power connector. The invention may be implemented using a computer program running on one or more processors.

Figure 3:
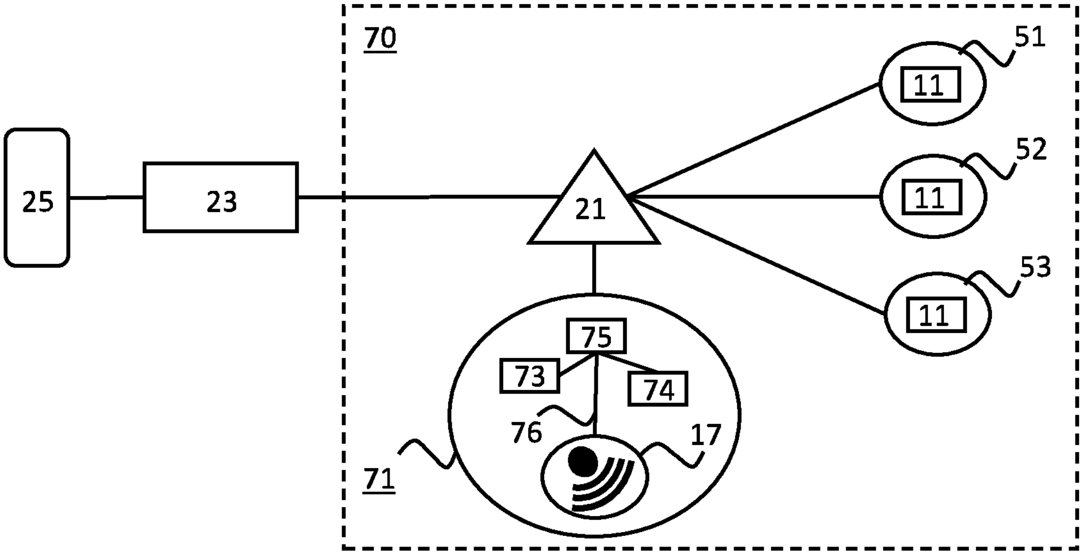
FIG. 3 is a block diagram of a third embodiment of the system.

FIG. 3 shows a third embodiment of the system for controlling one or more light sources based on a measured light level. In the third embodiment, the system is a sensor device 71. The sensor device 71 is part of a lighting system 70. The lighting system 70 further comprises a (light) controller 21 and three lighting devices 51-53. In the example of FIG. 3, the lighting devices 51-53 and the sensor device 71 are connected to the controller 21, e.g. using Zigbee. The controller 21 is connected to a wireless LAN access point 23, e.g. using Wi-Fi or Ethernet. In an alternative embodiment, the sensor device 71 is connected to the wireless LAN access point 23.

The sensor device 71 comprises a receiver 73, a transmitter 74, a processor 75, a light sensor 17, and an input interface 76 between the processor 75 and the light sensor 17. The processor 75 is configured to obtain mode information indicative of a current operating mode of the light sensor 17. This current operating mode has been selected from a plurality of operating modes. The plurality of operating modes comprises a first operating mode and a second operating mode.

The processor 75 is further configured to select a function based on the current operating mode. This function defines a relation between a reference measured light level and a target light output level. The light source 11 is controlled differently based on the measured light level according to a first function than according to a second function. The first function is associated with the first operating mode and the second function is associated with the second operating mode.

The processor 75 is further configured to obtain a measured light level from the light sensor 17 via the input interface 76, determine a light output level by applying the selected function to the measured light level, and control, via transmitter 74, the light source 11 of a lighting device associated with the light sensor 17 to render light with the determined light output level. In the example of FIG. 3, at least one of lighting devices 51-53 has been associated with the light sensor 17. In the embodiment of FIG. 3, the light source 11 is controlled by the sensor device 71 via the controller 21.

In the embodiment of FIG. 3, users may be able to set a mode of operation for each individual sensor in the system. This mode may be set during commissioning of the sensor and/or changed during usage of the sensor. The mode change may be initiated by the user or by the lighting system 70. During usage, users may be able to switch between different operating modes. For example, the user might be given an option in a smartphone app, e.g. running on mobile device 25, to toggle between the first and second operating modes or a button or switch may be provided on the sensor device 71 to set/change the operating mode.

In the embodiment of the sensor device 71 shown in FIG. 3, the sensor device 71 comprises one processor 75. In an alternative embodiment, the sensor device 71 comprises multiple processors. The processor 75 of the sensor device 71 may be a general-purpose processor or an application-specific processor. The receiver 73 and the transmitter 74 may use one or more wireless communication technologies. e.g. Zigbee, for communicating with the controller 21. In an alternative embodiment, multiple receivers and/or multiple transmitters are used instead of a single receiver and a single transmitter.

In the embodiment shown in FIG. 3, a separate receiver and a separate transmitter are used. In an alternative embodiment, the receiver 73 and the transmitter 74 are combined into a transceiver. The sensor device 71 may comprise other components typical for a sensor device such as a power connector and a memory. The invention may be implemented using a computer program running on one or more processors.

Figure 4:
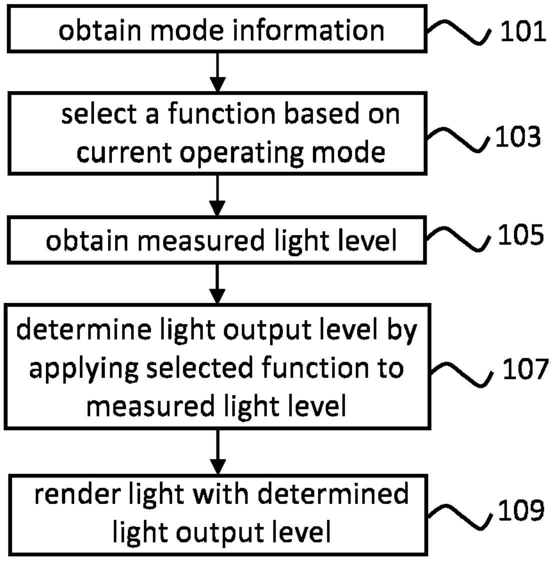
FIG. 4 is a flow diagram of a first embodiment of the method.

A first embodiment of the method of controlling one or more light sources based on a measured light level is shown in FIG. 4. The method may be performed by lighting device 1 of FIG. 1, controller 41 of FIG. 2, or sensor device 71 of FIG. 3, for example. A step 101 comprises obtaining mode information indicative of a current operating mode of a light sensor or a lighting device. The current operating mode has been selected from a plurality of operating modes. The plurality of operating modes comprises a first operating mode and a second operating mode.

A step 103 comprises selecting a function based on the current operating mode indicated in the mode information obtained in step 101. The function defines a relation between a reference measured light level and a target light output level. The one or more light sources are controlled differently based on the measured light level according to a first function than according to a second function. The first function is associated with the first operating mode and the second function is associated with the second operating mode. A step 105 comprises obtaining a measured light level. A step 107 comprises determining a light output level by applying the function selected in step 103 to the measured light level obtained in step 105. For color or tunable-white light sources, an additional step may comprise determining a color independent of the function selected in step 103. A step 109 comprises controlling one or more light sources to render light with the light output level determined in step 107. For color light sources, step 109 may further comprise controlling the one or more light sources to render the light with the determined color.

Figure 5:
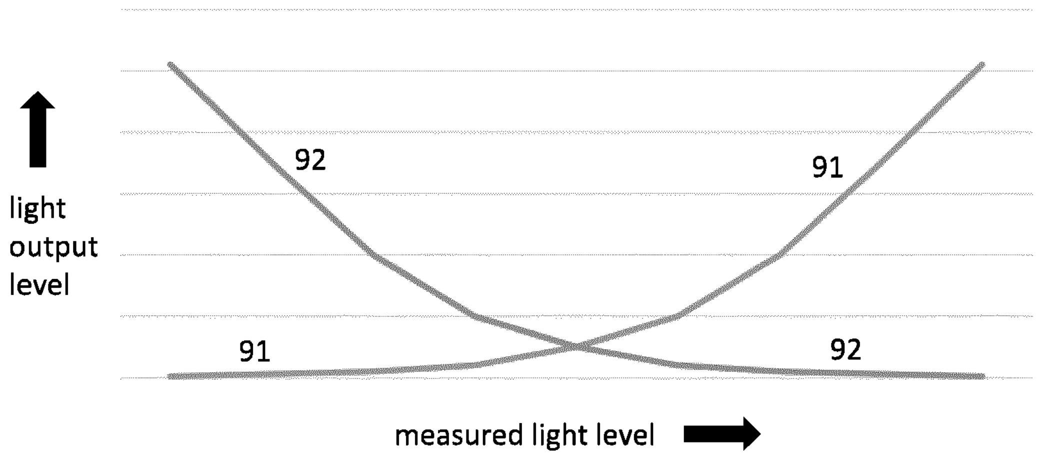
FIG. 5 shows an example of two functions, each defining a relation between a reference measured light level and a target light output level.

The first function may, for example, define a positive relation between the reference measured light level and the target light output level such that in the first function a first target light output level resulting from a first reference measured light level is larger than a second target light output level resulting from a second measured light level when the first reference measured light level is larger than the second reference measured light level. FIG. 5 shows an example of such a first function: a daylight following function 91. The operating mode associated with this function may be referred to as Daylight Following Mode (DFM).

In other words, in the DFM, the lighting device(s) associated with the light sensor are controlled based on the values of the light sensor according to a function based on a positive relation between ambient light level and light output of the controlled lighting devices. The higher ambient light level detected, the higher the light output of the controlled lighting devices. This mode is particularly useful in situations where the lighting devices provide decorative lighting—for example garden beautification, wall washing, etc.—where the light output of the decorative lights need to be increased with increased ambient light levels to ensure to decorative effect is visible.

Similarly, in the case of an entertainment mode in which light effects determined based on audio and/or video content are rendered while a rendering device renders the audio and/or video content, lighting devices that are rendering these entertainment light effects should preferably become brighter when the measured (ambient) light level increases in order to create a better contrast.

The second function may define a negative relation between the reference measured light level and the target light output level such that in the second function a third target light output level resulting from a third reference measured light level is smaller than a fourth target light output level resulting from a fourth measured light level when the third reference measured light level is larger than the fourth reference measured light level. FIG. 5 shows an example of such a second function: a daylight counterbalance function 92. The operating mode associated with this function may be referred to as Daylight Counterbalance Mode (DCM).

In other words, in the DCM, the lighting device(s) associated with the light sensor are controlled based on the values of the light sensor according to a function indicating a negative relation between measured ambient light level and light output of the controlled lighting devices. The higher the measured (ambient) light level, the lower the light output of the controlled lighting devices. This mode is particularly useful in situations where the lighting devices provide functional lighting, for example to work or read, where in case of sufficient daylight there is no need for electrical lighting.

In certain situations, some lighting devices that are in the same group/room may be set to follow function 91 (e.g. decorative lights in the group) while other lighting devices in the group may be set to follow function 92 (e.g. functional lights in the group).

Other functions of light output based on sensor input are possible, also beyond lumen output/brightness. For example, the measured light level could be used to control the color or saturation, or combinations of those. These functions could be simple linear functions as shown in FIG. 5 or more complex functions. As an example of the latter, a more complex function may be a combination of the daylight counterbalance function and the daylight following function. For instance, if the measured light level is below some threshold, daylight may be counterbalanced (harvested) and if the measured light level is above this threshold (or above a second threshold higher than this threshold), daylight may be followed. The latter may be used for decorative lighting, for example. Users may be able to set a mode of operation for each individual light sensor in the lighting system or per lighting device or group of lighting devices associated with the light sensor. This mode may be set during commissioning of the light sensor or lighting device(s) and/or changed during usage of the light sensor or lighting device(s). The operating mode may be set by a user (e.g. the user may select DCM for the kitchen table light) or by the system (e.g. based on lighting device archetype as programmed in the factory or a programmed property of the lighting device). For example, all the lighting devices that are labelled as functional lighting devices may by default operate in DCM while all decorative lighting devices may by default operate in DFM.

During usage, users may be able to switch between different operating modes. For example, the user might have an option in the smartphone app to toggle between DFM and DCM (e.g. per light sensor or per lighting device) or have a button or switch on the sensor device to change the operating mode. Alternatively or additionally, the mode and/or its parameters may be changed based on learning from a user's actual light control behavior. For example, if a light sensor is in DFM, but the user manually dims up the lights when the ambient light level goes down, the function or operating mode may be adapted (e.g. the range from minimum to maximum light levels might be made smaller or the operating mode may even be changed from DFM to DCM).

Figure 6:
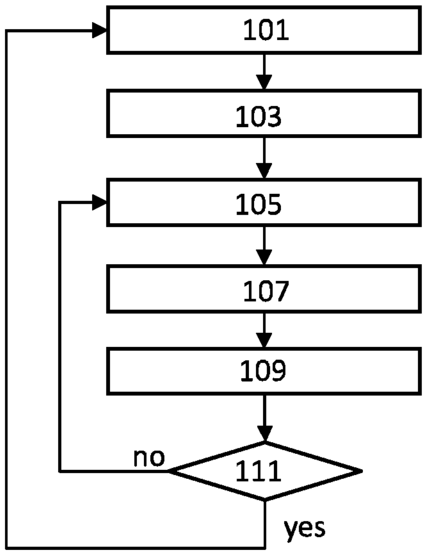
FIG. 6 is a flow diagram of a second embodiment of the method.

A second embodiment of the method of controlling one or more light sources based on a measured light level is shown in FIG. 6. The second embodiment of FIG. 6 is an extension of the first embodiment of FIG. 4. In the embodiment of FIG. 6, a step 111 is performed after step 109.

Step 111 comprises determining whether new mode information is available. Step 111 may comprise, for example, determining whether user input for changing the current operating mode has been received. If so, steps 101-111 are repeated. If not steps 105-111 are repeated. When step 101 is repeated, the current operating mode is changed, e.g. from the first operating mode to the second operating mode or from the second operating mode to the first operating mode.

Figure 7:
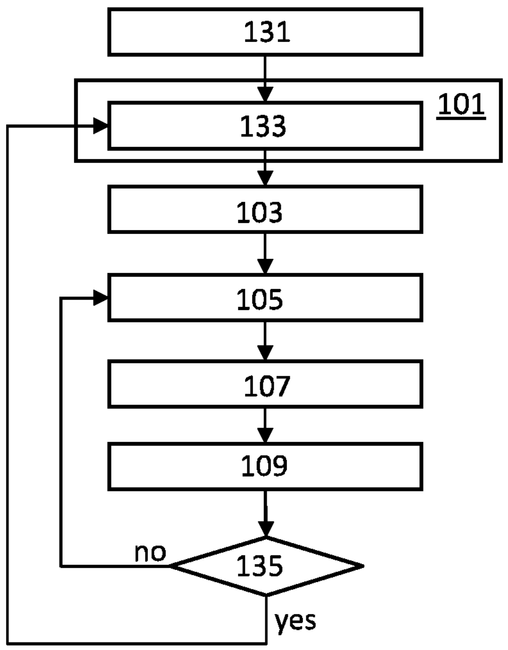
FIG. 7 is a flow diagram of a third embodiment of the method.

A third embodiment of the method of controlling one or more light sources based on a measured light level is shown in FIG. 7. The third embodiment of FIG. 7 is an extension of the second embodiment of FIG. 6. In the embodiment of FIG. 7, a step 131 is performed before step 101 of FIG. 6, step 101 of FIG. 6 is implemented by a step 133, and a step

135 is performed after step 109 of FIG. 6 (implementing step 111 of FIG. 6). Step 131 comprises obtaining information indicative of a type of space in which the light sensor or the lighting device is located and/or indicative of a time of day and/or indicative of detected motion and/or indicative of a detected activity of a user. The information indicative of detected motion may be indicative of detected (human) presence, for example. The detected activity may be work or may be leisure, for example.

Information indicative of the type of space in which the light sensor or the lighting device is located may be provided by the user, for example. For instance, during commissioning, the user may be able to assign a sensor device to a room and for that room, a default mode of the light sensor may be selected. For example, when the user places the sensor device in the entertainment room, DFM may be selected so that the brightness of the entertainment lighting devices will increase to ensure that the light effects are well visible, as there is more ambient lighting. If the same sensor device is placed in a home office, DCM may be selected, such that the lights dim down when there is sufficient daylight. In a simple implementation, the user selects a room when commissioning the sensor device, but other ways of determining the location of the sensor device may also be used. Alternatively, the user might be asked what the prime use case for the light sensor is when adding the sensor device to the lighting system.

Step 133 comprises obtaining mode information indicative of a current operating mode of a light sensor or a lighting device based on the information obtained in step 131. For example, different operating modes may be associated with different time intervals of the day. In this case, step 133 may comprise determining which of the defined time intervals is currently applicable based on the (current) time of day and obtaining mode information associated with the currently applicable time interval.

Step 135 comprises determining whether a new type of space has been assigned to the light sensor or the lighting device and/or whether the current time of day falls in another one of the defined time intervals and/or whether a difference in presence has been detected and/or whether another activity of the user has been detected. In any of these cases, steps 101-109 and step 135 are repeated. Otherwise, steps 105-109 and step 135 are repeated.

In step 135, the same kind of information as obtained in step 131 is obtained, but at a later time. When step 101 is repeated, the current operating mode is changed, e.g. from the first operating mode to the second operating mode or from the second operating mode to the first operating mode.

The following list contains examples of use cases related to the embodiment of FIG. 7:

- When the user places the sensor device in an entertainment area, DFM may be selected such that an increase in (ambient) light level as measured by the light sensor will increase the brightness of the entertainment lighting device to ensure the entertainment effects are well visible. In addition to this, to make the effects more visible, lighting devices in the room not part of the entertainment area may be controlled to dim-down even further or to switch-off.
- When the user places the sensor device on the dining table, DCM may be selected such that the functional lamp above the dinner table will dim down if an increase in measured light is detected (less artificial light is needed if there is more daylight).
- When the user places the sensor device in the garden, DFM may be selected such that the decorative/beautification lighting devices in the garden will be dimmed when the measured light level decreases and these lighting devices will be at their brightest in daytime.

When used with a motion and/or presence sensor (e.g., PIR) the system may control the lighting device in DCM when (excessive) motion is detected, but in DFM when no (excessive) motion is detected to support the user with enough light when moving around the room.

When used with activity detection (e.g. with the help of a camera), the system may control the lighting device in DCM when the user is detected to be working, but in DFM when the user is detected to be performing a leisure activity.

Figure 8:
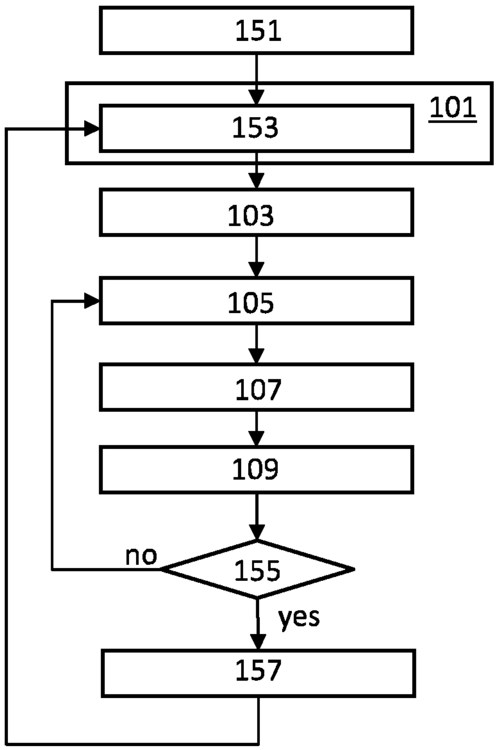
FIG. 8 is a flow diagram of a fourth embodiment of the method.

A fourth embodiment of the method of controlling one or more light sources based on a measured light level is shown in FIG. 8. The fourth embodiment of FIG. 8 is an extension of the second embodiment of FIG. 6. In the embodiment of FIG. 8, a step 151 is performed before step 101 of FIG. 6, step 101 of FIG. 6 is implemented by a step 153, and steps 155 and 157 are performed after step 109 of FIG. 6 (step 155 implementing step 111 of FIG. 6).

Step 151 comprises detecting a current light setting of the lighting device and/or a current light scene which the lighting device is rendering. Step 153 comprises determine the current operating mode of the lighting device by determining an operating mode associated with the current light setting or the current light scene, as detected in step 151. Step 155 comprises determining whether user input for selecting a (different) light scene involving at least the lighting device or user input for selecting a (different) light setting for the lighting device has been received. If so, step 157 is performed next. If not, steps 105-109 and step 155 are repeated.

Step 157 comprises controlling at least the lighting device based on the user input, i.e. changing the light setting on the lighting device, e.g. based on the selected light scene. Steps 101-109 and step 155 are repeated after step 157. When step 101 is repeated, the current operating mode is changed, e.g. from the first operating mode to the second operating mode or from the second operating mode to the first operating mode.

Thus, in the embodiment of FIG. 8, the operating mode might change if the current light scene of a lighting device changes, e.g., to DFM if the entertainment mode is started and to DCM if the entertainment mode is stopped if the lighting device is part of the entertainment zone. The operating mode might also be changed based on a brightness and/or color setting of a lighting device. For example, if most of the lighting devices in a zone are rendering saturated colors, the operating mode of the light sensor might be changed to DFM. Each light scene may have an option or setting that indicates the associated operating mode, e.g., colorful decorative scenes may be associated with DFM while a “Reading” scene may be associated with DCM. The embodiments of FIGS. 7 and 8 may be combined.

Figure 9:
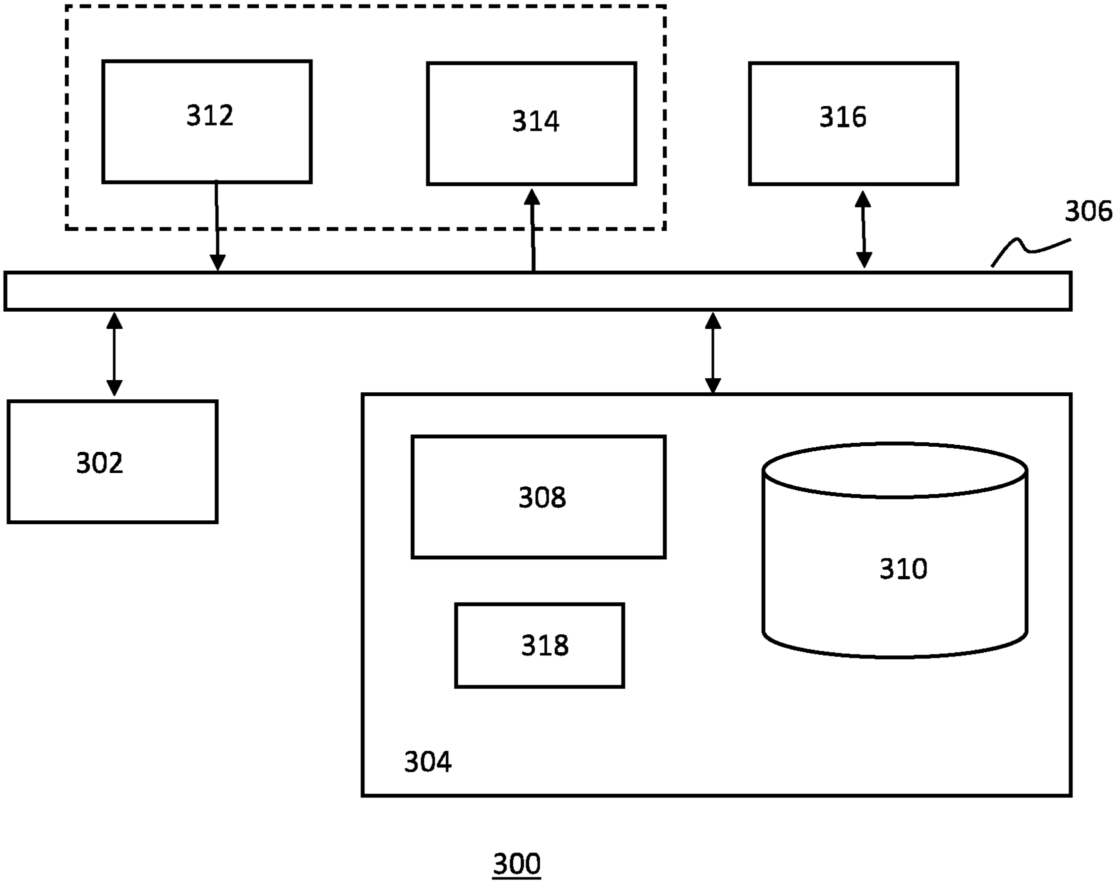
FIG. 9 is a block diagram of an exemplary data processing system for performing the method of the invention.

FIG. 9 depicts a block diagram illustrating an exemplary data processing system that may perform the method as described with reference to FIGS. 4, 6, 7, and 8. As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a “touch screen display” or simply “touch screen”. In such an embodiment, input to the device may be provided by a movement of a physical object, such as e.g. a stylus or a finger of a user, on or near the touch screen display. A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 9 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal. Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling one or more light sources based on a measured light level, said system comprising:

at least one input interface;

at least one control interface; and at least one processor configured to:

obtain mode information indicative of a current operating mode of a light sensor or a lighting device, said current operating mode having been selected from a plurality of operating modes, said plurality of operating modes comprising a first operating mode and a second operating mode, select a function based on said current operating mode, wherein said function defines a relation between a reference measured light level and a target light output level, said one or more light sources being controlled differently based on said measured light level according to a first function than according to a second function, said first function being associated with said first operating mode and said second function being associated with said second operating mode, obtain, via said at least one input interface, said measured light level, determine a light output level by applying said selected function to said measured light level, and control, via said at least one control interface, said one or more light sources to render light with said determined light output level, wherein said first function defines a positive relation between said reference measured light level and said target light output level such that in said first function a first target light output level resulting from a first reference measured light level is larger than a second target light output level resulting from a second measured light level when said first reference measured light level is larger than said second reference measured light level, and wherein said second function defines a negative relation between said reference measured light level and said target light output level such that in said second function a third target light output level resulting from a third reference measured light level is smaller than a fourth target light output level resulting from a fourth measured light level when said third reference measured light level is larger than said fourth reference measured light level.

2. The system as claimed in claim 1, wherein said at least one processor is configured to change said current operating mode from said first operating mode to said second operating mode and/or from said second operating mode to said first operating mode.

3. The system as claimed in claim 2, wherein said at least one processor is configured to receive, via a user interface of said system, user input for changing said current operating mode.

4. The system as claimed in claim 2, wherein said at least one processor is configured to:

obtain information indicative of a type of space in which said light sensor or said lighting device are located and/or indicative of a time of day, and change said current operating mode based on said type of space and/or said time of day.

5. The system as claimed in claim 2, wherein said at least one processor is configured to:

detect motion and/or an activity of a user and/or obtain a measured spectral composition, and change said current operating mode based on said detected motion and/or activity and/or said measured spectral composition.

6. The system as claimed in claim 2, wherein said mode information is indicative of a current operating mode of a lighting device and said at least one processor is configured to:

detect a current light setting of said lighting device, and change said current operating mode based on said current light setting of said lighting device.

7. The system as claimed in claim 2, wherein said mode information is indicative of a current operating mode of a lighting device and said at least one processor is configured to:

receive input for selecting a light scene involving at least said lighting device, determine said current operating mode of said lighting device by determining an operating mode associated with said light scene, and change said current operating mode to said operating mode associated with said light scene.

8. The system as claimed in claim 1, wherein said mode information is indicative of a current operating mode of a lighting device and said lighting device comprises said one or more light sources.

9. The system as claimed in claim 1, wherein said mode information is indicative of a current operating mode of a light sensor and one or more lighting devices associated with said light sensor comprise said one or more light sources.

10. The system as claimed in claim 1, wherein said at least one processor is configured to determine a or color temperature independent of said selected function and control, via said at least one control interface, said one or more light sources to render said light with said determined color or color temperature.

11. A lighting system comprising the system according to claim 1 and at least one of: said one or more light sources and a light sensor for measuring said measured light level.

12. A method of controlling one or more light sources based on a measured light level, said method comprising:

obtaining mode information indicative of a current operating mode of a light sensor or a lighting device, said current operating mode having been selected from a plurality of operating modes, said plurality of operating modes comprising a first operating mode and a second operating mode;

selecting a function based on said current operating mode, wherein said function defines a relation between a reference measured light level and a target light output level, said one or more light sources being controlled differently based on said measured light level according to a first function than according to a second function, said first function being associated with said first operating mode and said second function being associated with said second operating mode;

obtaining said measured light level;

determining a light output level by applying said selected function to said measured light level; and controlling said one or more light sources to render light with said determined light output level, wherein said first function defines a positive relation between said reference measured light level and said target light output level such that in said first function a first target light output level resulting from a first reference measured light level is larger than a second target light output level resulting from a second measured light level when said first reference measured light level is larger than said second reference measured light level, and wherein said second function defines a negative relation between said reference measured light level and said target light output level such that in said second function a third target light output level resulting from a third reference measured light level is smaller than a fourth target light output level resulting from a fourth measured light level when said third reference measured light level is larger than said fourth reference measured light level.

13. A non-transitory computer-readable medium having stored thereon a computer program to perform the method of claim 12 when run on a processor.

* * * * *